(12) United States Patent
Okada et al.

(10) Patent No.: US 10,645,206 B2
(45) Date of Patent: May 5, 2020

(54) MOBILE TERMINAL (71) Applicant: Panasonic Intellectual Property Management Co., Ltd., Osaka (JP)

(72) Inventors: Yoshikazu Okada, Fukuoka (JP); Yoshihiro Mizoguchi, Fukuoka (JP); Yasushi Kitajima, Fukuoka (JP); Yoshihiro Takata, Fukuoka (JP); Yusuke Matsushita, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 5 days.

(21) Appl. No.: 15/879,720

(22) Filed: Jan. 25, 2018

(65) Prior Publication Data

US 2019/0052737 A1  Feb. 14, 2019

(30) Foreign Application Priority Data

Aug. 14, 2017  (JP) ................ 2017-156584

(51) Int. Cl.
  *H04M 1/02*  (2006.01)
  *H04B 1/3883*  (2015.01)
  (Continued)

(52) U.S. Cl.
  CPC .......... *H04M 1/0249* (2013.01); *H04B 1/385* (2013.01); *H04B 1/3883* (2013.01);
  (Continued)

(58) Field of Classification Search
  CPC .... A45F 5/00; A45F 5/004; A45F 5/02; A45F 5/021; F16M 11/041; F16M 13/00; F16M 13/022; F41C 33/045; G06F 1/16; G06F 1/1632; G06F 1/1635; G06F 1/1656; H01M 2/1022; H01M 2/1066; H02J 5/00; H02J 7/0013; H02J 7/0042; H02J 7/0044; H02J 7/0052; H02J 7/0055; H02J 7/02; H04B 1/3805; H04B 1/3883; H04B 1/3888;
  (Continued)

(56) References Cited

U.S. PATENT DOCUMENTS 5,748,454 A * 5/1998 Nichols ............... A45F 5/02
                                                              24/3.11
6,032,337 A * 3/2000 Rankin, Jr. ............ A45F 5/02
                                                              24/3.1
(Continued)

FOREIGN PATENT DOCUMENTS

JP          3086507          6/2002

*Primary Examiner* — Yuwen Pan
*Assistant Examiner* — Paul P Tran
(74) *Attorney, Agent, or Firm* — Wenderoth, Lind & Ponack, L.L.P.

(57) ABSTRACT

Provided is a mobile terminal including a main body that has a battery storage portion which stores a battery in the shape of a rectangle and that extends in a long-side direction; a holding member that holds a target-for-holding portion which is a body separate from the main body, and thus that attaches the main body to the target-for-holding portion; and a lid that is removably attached to the main body and that has a first portion which covers the battery storage portion and a second portion which extends from an end portion of the first portion and on which the holding member is provided.

11 Claims, 6 Drawing Sheets

(51) Int. Cl.
*H04B 1/3888* (2015.01)
*H04M 1/04* (2006.01)
*H04B 1/3827* (2015.01)

(52) U.S. Cl.
CPC ........ *H04B 1/3888* (2013.01); *H04M 1/0254* (2013.01); *H04M 1/04* (2013.01); *H04M 1/0262* (2013.01)

(58) Field of Classification Search
CPC ............. H04M 1/0249; H04M 1/0254; H04M 1/0262; H04M 1/04; H04M 19/08; H04W 52/0267; H05K 5/0086; H05K 5/0217; H05K 5/0247
USPC ................... 455/575.1, 575.6; 224/197, 269; 228/301; 320/114
See application file for complete search history.

(56) References Cited

U.S. PATENT DOCUMENTS

| | | | | |
|---|---|---|---|---|
| 6,064,577 | A * | 5/2000 | Moskowitz | H04B 1/385 206/340 |
| 2004/0069821 | A1* | 4/2004 | Kobayashi | A45F 5/02 224/269 |
| 2005/0040192 | A1* | 2/2005 | Steven, III | A45F 5/02 224/197 |
| 2005/0088141 | A1* | 4/2005 | Lee | H02J 7/00 320/114 |
| 2012/0074006 | A1* | 3/2012 | Monaco | H04M 1/15 206/320 |
| 2018/0351141 | A1* | 12/2018 | Hayahi | H01M 2/1066 |

\* cited by examiner

MOBILE TERMINAL

BACKGROUND

1. Technical Field

The present disclosure relates to a mobile terminal that is capable of simplifying an operation at the time of removing a lid from a main body.

2. Description of the Related Art

In the related art, for example, in Japanese Registered Utility Model No. 3086507, a configuration is disclosed in which a clip is attached to the rear surface of a mobile terminal and thus a user easily attaches the mobile terminal to a pocket of his/her clothes or the like when carrying the mobile terminal with him/her.

In recent years, small-sized mobile terminals, each of which has a main body in the shape of a thin rectangular parallelepiped, have come into wide spread, but in some cases, according to various environments where the user uses his/her mobile terminal, such as utilization of a hands-free function and the like, a holding member such as a clip is also provided on the mobile terminal.

It is considered that the holding member that is provided on the mobile terminal, for example, is attached in a position that is at a distance away from a battery storage portion, in the back side of a main body thereof.

However, in order to replace a battery in the mobile terminal, when a lid covering the battery storage portion is removed from the main body, there occurs a problem in that the lid is difficult to remove from the main body due to the holding member. This is because in terms of a situation of a space in the main body, there is a high likelihood that the holding member and the lid will overlap each other and the holding member is an obstacle to the removal of the lid.

When the holding member and the lid overlap each other, because at the time of replacing the battery, there is a need to remove the holding member from the main body and then to remove the lid from the main body. Because of this, there is a concern that a troublesome operation will occur for the user.

SUMMARY

An object of the present disclosure is to provide a mobile terminal that is capable of simplifying an operation at the time of removing a lid from a main body.

According to an aspect of the present disclosure, there is provided a mobile terminal including a main body that has a battery storage portion which stores a battery in the shape of a rectangle and that extends in a long-side direction; a holding member that holds a target-for-holding portion which is a body separate from the main body, and thus that attaches the main body to the target-for-holding portion; and a lid that is removably attached to the main body and that has a first portion which covers the battery storage portion and a second portion which extends from an end portion of the first portion and on which the holding member is provided.

According to the present disclosure, an operation can be simplified at the time of removing a lid from a main body.

DETAILED DESCRIPTION

Figure 1:
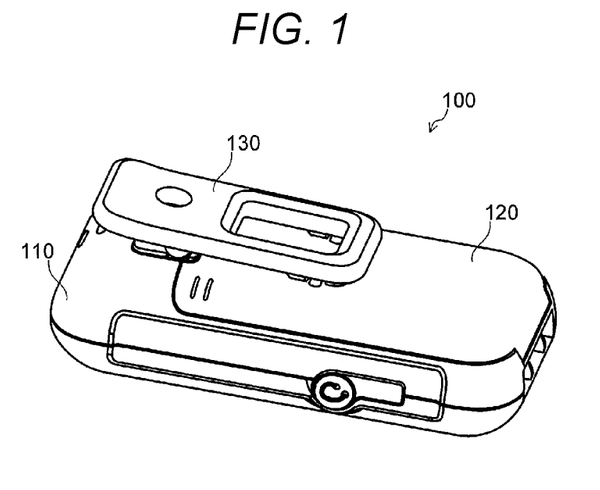
FIG. 1 is a perspective diagram of a mobile terminal according to the present embodiment, when viewed from the rear surface side thereof.

The present embodiment will be described in detail below with reference to the drawings. FIG. 1 is a perspective diagram of mobile terminal 100 according to the present embodiment, when viewed from the rear surface side thereof.

As illustrated in FIG. 1, mobile terminal 100 has, for example, a mobile telephone such as a smartphone, main body 110, lid 120, and holding member 130.

Main body 110 is a part that functions as the mobile telephone, and is configured to be in the shape of a rectangle that extends in a long-side direction. The long-side direction is a direction along a long part of main body 110, and is the leftward-inclined upward direction or the rightward-inclined downward direction in FIG. 1 or 3.

Figure 2:
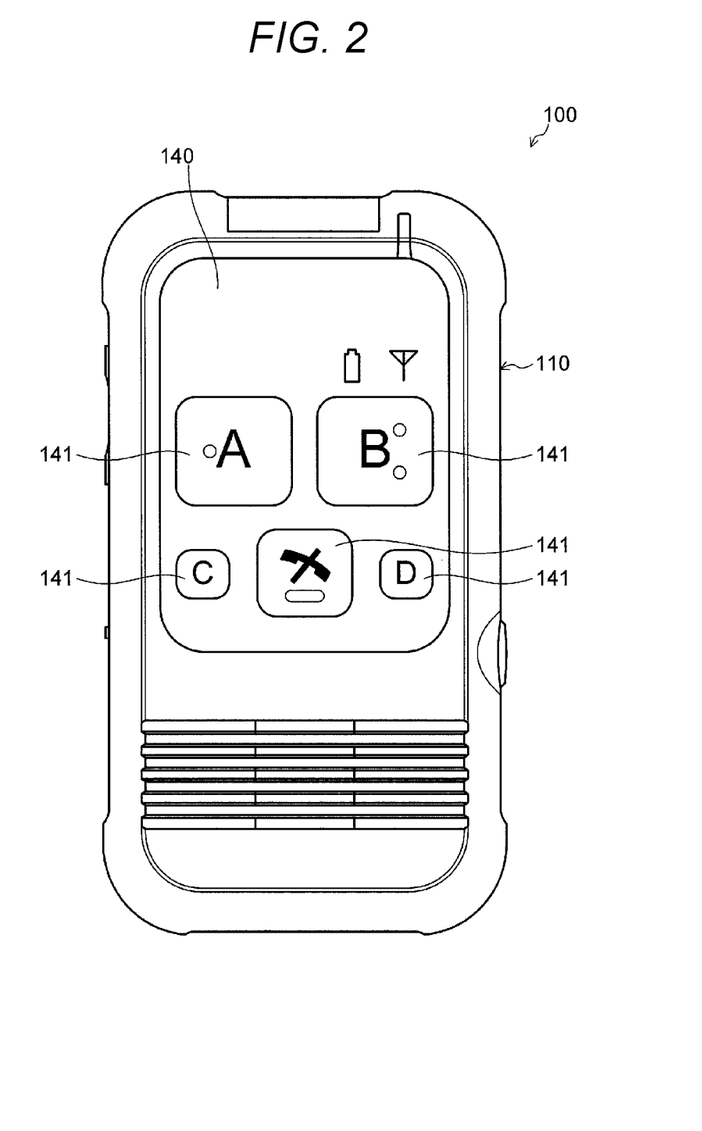
FIG. 2 is a front-view diagram of the mobile terminal.

As illustrated in FIG. 2, operation unit 140 is provided on the front surface of main body 110. Provided on operation unit 140 is operation button 141 for performing various operations of mobile terminal 100. Operation unit 140 may be in the shape of a touch panel.

Figure 3:
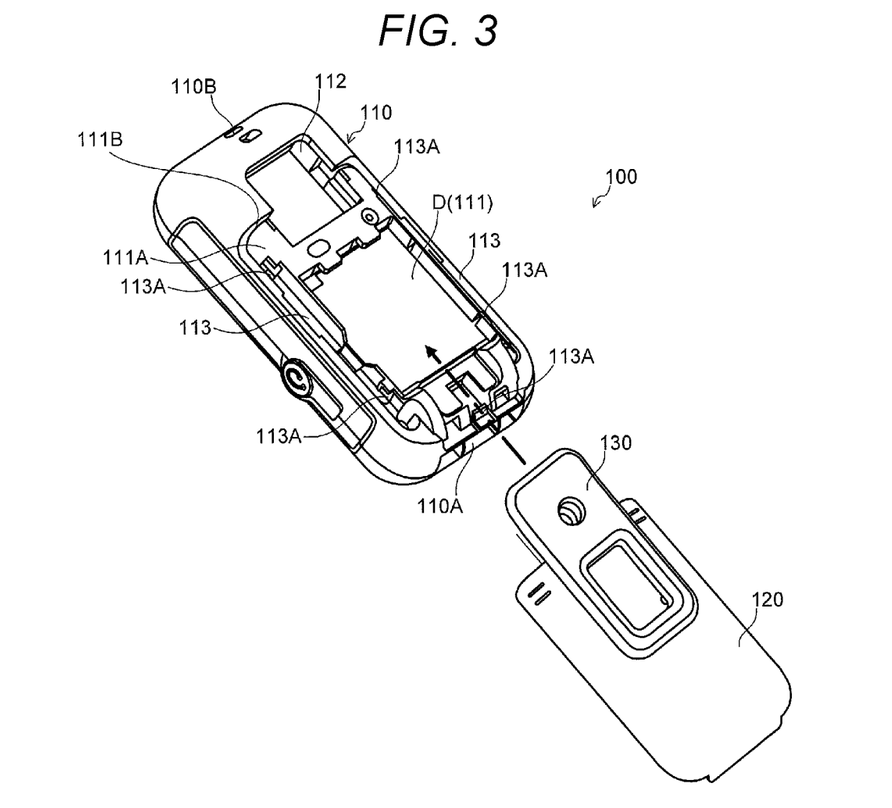
FIG. 3 is an exploded diagram of the mobile terminal according to the present embodiment.

As illustrated in FIG. 3, battery storage portion 111 that stores battery D in the shape of a rectangle is provided on the rear surface of main body 110. Battery storage portion 111 is formed in such a shape that battery D is inserted into battery storage portion 111. The mounting of lid 120 on main body 110 causes battery storage portion 111 to be covered with lid 120.

A recharging port for recharging battery D is provided on first end portion 110A on the lower side (the other side) in the long-side direction, of main body 110. Therefore, battery storage portion 111 is provided to be positioned closer to first end portion 110A than to second end portion 110B on the upper side (one side) in the long-side direction, of main body 110.

Furthermore, reserved-for-mounting portion 111A which is a part in the vicinity of battery storage portion 111, of main body 110 and on which lid 120 is mounted is more lowered by the thickness of lid 120 than a part other than reserved-for-mounting portion 111A, of main body 110, that is, a part that is positioned in the vicinity of lid 120.

In main body 110, engagement portion 112 with which second portion 122 of lid 120, which will be described, is engaged is provided to be positioned closer to second end portion 110B than to battery storage portion 111. Engagement portion 112 is provided in a manner that is recessed, toward second end portion 110B, from second end portion 110B-side edge 111B of reserved-for-mounting portion 111A.

Engagement portion 112 is formed to be recessed from reserved-for-mounting portion 111A in the direction from the rear surface to the front surface, and is provided in a range where engagement portion 112 straddles second end portion 110B-side edge 111B of reserved-for-mounting portion 111A.

Furthermore, rails 113 in a pair are provided on both sides, respectively, in a short-side direction of main body 110, of battery storage portion 111. The short-side direction of main body 110 is a direction different from the long-side direction, is a direction along a short-side part of main body 110, and refers to the leftward-inclined downward direction or the rightward-inclined upward direction in FIG. 3.

The pair of rails 113 extends in the long-side direction of main body 110, and causes lid 120 to slide for movement. Lid 120 is caused to slide along the pair of rails 113 and thus is removably attached to main body 110.

Figure 4:
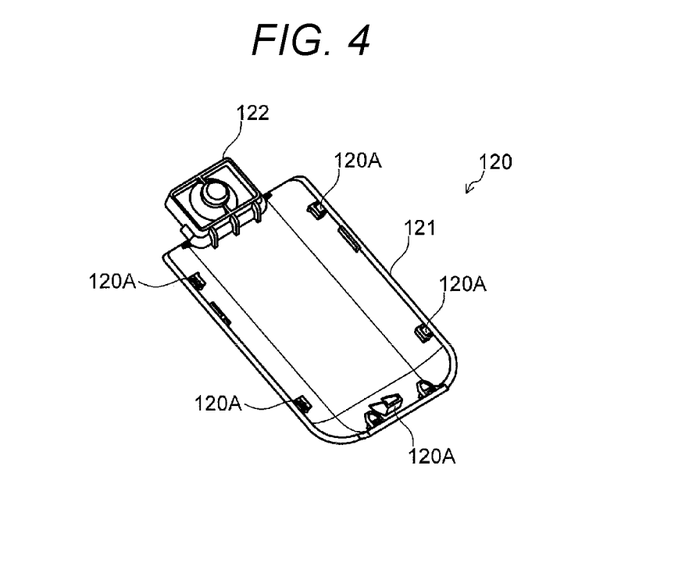
FIG. 4 is a diagram when viewed from the back of a lid.

Furthermore, lock portion 113A, with which claw 120A that is provided on the back surface of lid 120 which is illustrated in FIG. 4 is engaged, is provided on the pair of rails 113 and first end portion 110A of main body 110. Five lock portions 113A are provided, two on each rail 113 and one on first end portion 110A.

Lid 120 is removably attached to main body 110, and, as illustrated in FIG. 4, has first portion 121 and second portion 122. First portion 121 is a part that covers battery storage portion 111, and has its shape that runs along reserved-for-mounting portion 111A. Furthermore, as described above, because reserved-for-mounting portion 111A is more lowered by the thickness of lid 120 than a part other than main body 110, the mounting of lid 120 to main body 110 causes a part in the vicinity of lid 120, of main body 110 and lid 120 to lie in approximately one plane (refer to FIG. 1).

Claws 120A that are provided on the back surface of first portion 121 are positioned in positions, respectively, that correspond to lock portions 113A. Lid 120 is caused to move along the pair of rails 113 toward second end portion 110B, claw 120A and lock portion 113A are engaged with each other, and thus lid 120 is mounted on main body 110. Furthermore, when lid 120 is caused to move along rails 113 toward first end portion 110A, claw 120A and lock portion 113A are disengaged from each other and thus lid 120 is removed from main body 110.

Second portion 122 is a part to which holding member 130 is fixed, and extends from an upper-side (one side) end portion in FIG. 4, of first portion 121. Second portion 122 has a narrower width than first portion 121, and is formed in such a manner that second portion 122 is possibly engaged with engagement portion 112 in FIG. 3.

Because engagement portion 112 is positioned more toward second end portion 110B than reserved-for-mounting portion 111A, when lid 120 is mounted on main body 110, engagement portion 112 and second portion 122 are engaged with each other more toward second end portion 110B (one side) than battery storage portion 111.

Figure 5:
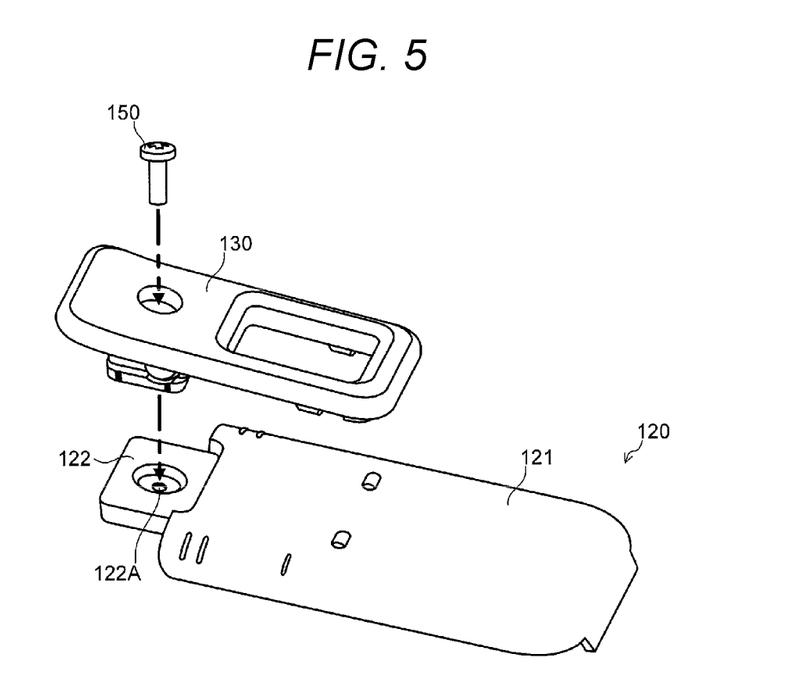
FIG. 5 is an exploded diagram of the lid and a holding member.
Figure 6:
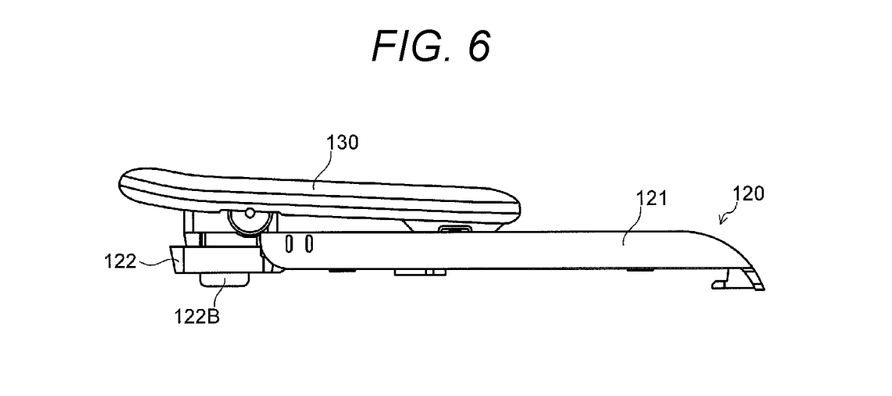
FIG. 6 is a side-view diagram of the lid to which the holding member is fixed.

As illustrated in FIG. 5, nut 122A into which bolt 150 for fixing holding member 130 is screwed is inserted into second portion 122. Part 122B in which nut 122A in second portion 122 is installed is more recessed than other parts in the second portion 122. Therefore, as illustrated in FIG. 6, part 122B in which nut 122A in second portion 122 is installed protrudes more downward than the lower surface of second portion 122.

Furthermore, because holding member 130 is a fixed part, second portion 122 needs to secure a certain degree of rigidity. Specifically, a side wall that surrounds the back surface of second portion 122 is provided on the back side of second portion 122, a part that is second portion 122 is caused to have the greater thickness. This secures the rigidity of second portion 122 (refer to FIG. 4).

When the side wall is built to protrude from a surface of second portion 122, the thickness of a part that is second portion 122 of mobile terminal 100 is increased, this is not preferable in terms of making mobile terminal 100 thinner and lighter. Accordingly, in the present embodiment, the side wall is built to protrude from the back surface of second portion 122 and thus the entire thickness of mobile terminal 100 is suppressed from being increased while securing the rigidity of second portion 122.

As described above, because engagement portion 112 is recessed from reserved-for-mounting portion 111A, when lid 120 is mounted on main body 110, second portion 122 is inserted into a part that is engagement portion 112. Therefore, when lid 120 is mounted on main body 110, second portion 122 does not collide with the bottom of engagement portion 112, and lid 120 can be easily mounted on main body 110.

Furthermore, because second portion 122 is configured to be thickened toward the back surface side of first portion 121, for example, in a case where, in order to remove because lid 120, lid 120 is caused to slide toward first end portion 110A, there is a concern that collision with edge 111B of engagement portion 112 will take place.

However, in the present embodiment, engagement portion 112 is provided in the range where engagement portion 112 straddles second end portion 110B-side edge 111B of reserved-for-mounting portion 111A. More precisely, a space in which second portion 122 is movable in the long-side direction is formed in engagement portion 112. As a result, when lid 120 is caused to slide in the long-side direction, second portion 122 does not collide with edge 111B of engagement portion 112, and lid 120 can be caused to move into the space.

Figure 7:
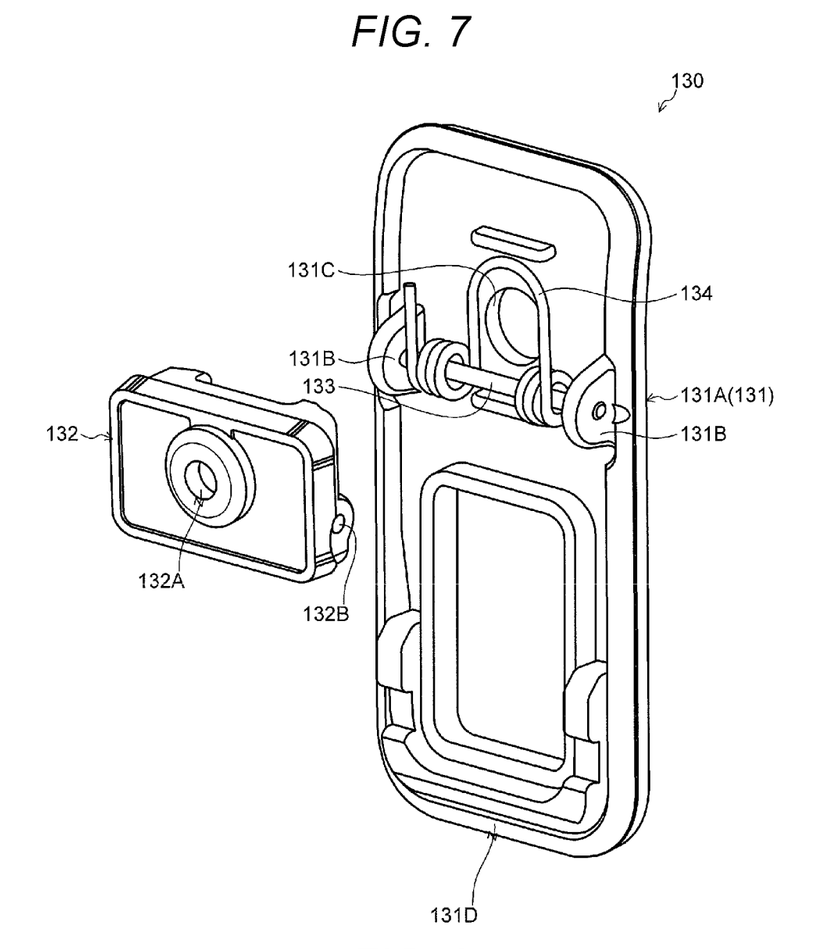
FIG. 7 is an exploded diagram of the holding member.

As illustrated in FIG. 7, holding member 130 is a clip for attaching a target-for-holding portion to main body 110 by holding the target-for-holding portion that is a body which is separated from main body 110. Examples of the target-for-holding portion may include the top portion of a pocket and the like, to which mobile terminal 100 is attachable.

Holding member 130 has clip portion 131, target-for-fixing portion 132, rotation shaft 133, and wire spring 134.

Clip portion 131 is a part that holds the target-for-holding portion, and has clip main body portion 131A and first shaft support portion 131B. Clip main body portion 131A is configured to be in the shape of a rectangle. Hole 131C through which bolt 150 possibly passes is formed in clip main body portion 131A.

First shaft support portions 131B in a pair are provided adjacent to both sides, respectively, of hole 131C in clip main body portion 131A, and shaft-supports rotation shaft 133.

Target-for-fixing portion 132 is a part that is fixed to second portion 122, and is configured to be in the shape of a rectangle that is smaller than clip main body portion 131A. Threaded hole 132A into which bolt 150 is screwed is formed in target-for-fixing portion 132. Second shaft support portions 132B (only one of which is illustrated) are provided adjacent to both sides, respectively, of threaded hole 132A in target-for-fixing portion 132.

Figure 8:
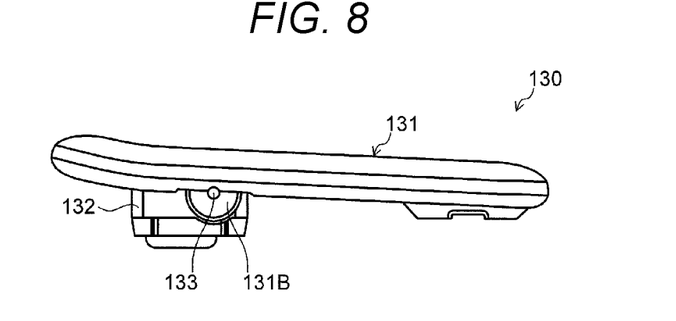
FIG. 8 is a side-view diagram of the holding member.

Second shaft support portion 132B shaft-supports not only first shaft support portion 131B, but also rotation shaft 133. Accordingly, as illustrated in FIG. 8, clip portion 131 possibly rotates about rotation shaft 133 with respect to target-for-fixing portion 132.

Figure 9:
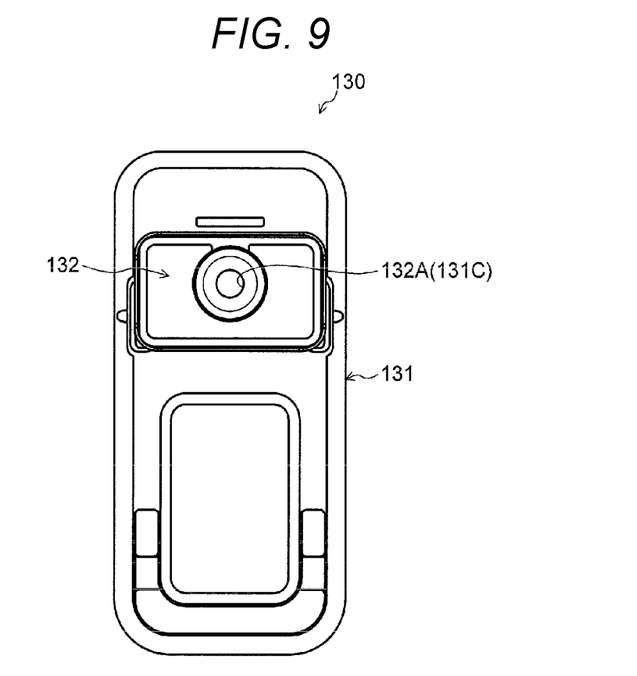
FIG. 9 is a diagram of the holding member when viewed from the back thereof.

Furthermore, as illustrated in FIG. 9, target-for-fixing portion 132 is attached to clip portion 131 and thus threaded hole 132A in target-for-fixing portion 132 is positioned to overlap hole 131C in clip portion 131. Accordingly, bolt 150 passes through hole 131C inward from clip portion 131, is then screwed into nut 122A through threaded hole 132A, and thus can fix holding member 130 to lid 120.

Furthermore, target-for-fixing portion 132 is attached in a position that corresponds to hole 131C in clip main body portion 131A, specifically, a position that is higher than the center of clip main body portion 131A. Therefore, when fixed to second portion 122 of main body 110, clip portion 131 is positioned to overlap first portion 121 (refer to FIG. 1 and figures).

As illustrated in FIG. 7, wire spring 134 is provided on rotation shaft 133, and exerts a force on end portion 131D, which is remote from target-for-fixing portion 132 in clip portion 131, toward the target-for-fixing portion 132. With the force exerted by wire spring 134, when clip portion 131 rotates with respect to target-for-fixing portion 132, a force to cause clip portion 131 to return toward target-for-fixing portion 132 acts. Accordingly, in clip portion 131, the target-for-holding portion is held between lid 120, more precisely, a part that overlaps first portion 121 and first portion 121.

Figure 10:
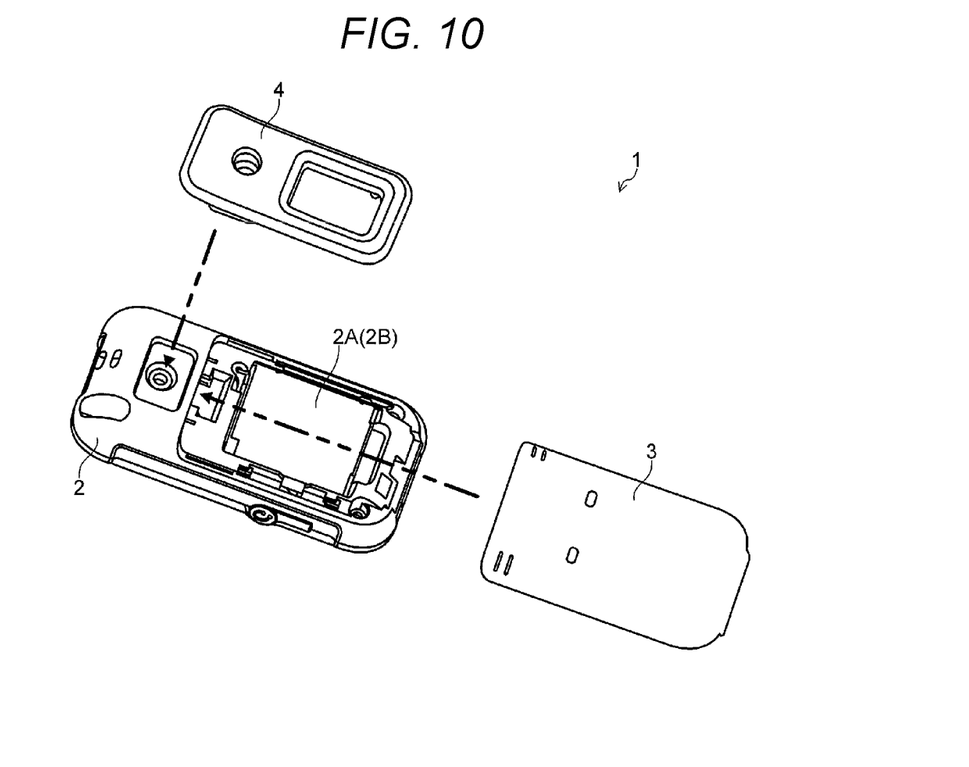
FIG. 10 is an exploded perspective diagram of a holding member in terms of configuration, in an example of a mobile terminal in the related art.

Incidentally, a configured is considered in which, in a case where the holding member is attached to the mobile terminal, for example, in like mobile terminal 1 that is illustrated in FIG. 10, holding member 4 is attached in a position that is a distance away from lid 3 in main body 2.

Specifically, battery storage portion 2B that stores battery 2A is provided in main body 2. A part that is battery storage portion 2B is covered with lid 3 that is mounted on main body 2. Holding member 4 is attached in a position that is at a distance away from lid 3 of main body 2.

However, in order to replace battery 2A in mobile terminal 1, when lid 3 is removed from main body 2, there occurs a problem in that lid 3 is difficult to remove from main body 2 due to holding member 4. This is because in terms of the situation of the space in main body 2, there is a high likelihood that holding member 4 and lid 3 will overlap each other and holding member 4 is an obstacle to the removal of lid 3.

Furthermore, it is considered that in mobile terminal 1, main body 2 is further miniaturized and thus the property of being attachable to clothes or the like is further improved. However, it is considered that, when main body 2 is further miniaturized, because it is easy for holding member 4 and lid 3 to overlap each other, the problem described problem is remarkable.

When holding member 4 and lid 3 overlap each other, because at the time of replacing battery 2A, there is a need to remove holding member 4 from main body 2 and then to remove lid 3 from main body 2. Because of this, there occurs a concern that a troublesome operation will occur for a user.

However, in the present embodiment, as illustrated in FIGS. 1 and 3, because holding member 130 is fixed to lid 120, lid 120 and holding member 130 can be caused to move together as if they were one piece. Therefore, in a case where battery D is not replaced, without needing to remove holding member 130, lid 120 is removed from main body 110 and thus battery D can be replaced. Accordingly, without causing the troublesome operation to occur for the user, battery D can be easily replaced, and eventually an operation at the time of removing lid 120 can be simplified.

Furthermore, because lid 120 can be removed by grasping holding member 130, lid 120 can be easily removed from main body 110 when compared with lid 120 to which holding member 130 is not fixed.

Incidentally, a part in which battery D is positioned in main body 110 has the comparatively great thickness due to the thickness of battery D. Therefore, in a case where holding member 130 is attached to a part that is first portion 121 in lid 120, there is a concern that the thickness of main body 110 will further increase due to a fixation structure of holding member 130.

However, in the present embodiment, because holding member 130 is fixed to second portion 122 in lid 120, the thickness of a part in which battery D is positioned in main body 110 can be the same as the thicknesses of other parts. Therefore, for example, even in a case where main body 110 is made thinner in terms of improving the property of being attachable to the target-for-holding portion, the thickness of main body 110 can be suppressed from increasing due to holding member 130 and eventually the main body 110's property of being attachable to the target-for-holding portion can be caused to be improved.

Furthermore, when holding member 130 is fixed to first portion 121, the target-for-holding portion is held by holding member 130 in a part that is close to first end portion 110A of main body 110. When this is done, because approximately the upper half of main body 110 is positioned over the target-for-holding portion, main body 110 rotates in a part that is holding member 130, and thus the upper half of main body 110 is easily inclined and eventually main body 110 is difficult to hold in a stable position.

However, in the present embodiment, because holding member 130 is fixed to second portion 122 that extends from second end portion 110B-side end portion of first portion 121, main body 110 can be mounted on the target-for-holding portion, taking the shape in which main body 110 hangs from the target-for-holding portion. Therefore, main body 110 can be attached, in a stable position, to the target-for-holding portion.

Furthermore, because second portion 122 is engaged with engagement portion 112, lid 120 can be caused to be firmly mounted on main body 110 and eventually the lid 120's property of being attachable to main body 110 can be improved.

In the embodiment described above, holding member 130 is fixed lid 120, but the present disclosure is not limited to this, lid 120 and holding member 130 may be configured to be integrated into one piece.

Furthermore, in the embodiment described, second portion 122 is configured to be engaged with main body 110. The present disclosure is not limited to this and second portion 122 may be configured not to be engaged with main body 110.

In addition, any embodiment described above is only an example of specific implementation of the present disclosure, and due to this, the technological scope of the present disclosure is not interpreted to a limited extent. That is, various modifications can be implemented without departing from the gist or principal feature of the present disclosure.

What is claimed is:

1. A mobile terminal comprising:
   a main body that has a battery storage portion which stores a battery in the shape of a rectangle and that extends in a long-side direction;
   a holding member that holds a target-for-holding portion which is a body separate from the main body, wherein the holding member attaches the main body to the target-for-holding portion; and a lid that is removably attached to the main body and that has a first portion which covers the battery storage portion and a second portion which extends from an end portion of the first portion and on which the holding member is provided, wherein the holding member is fixed to the lid such that the lid and the holding member are movable together as one piece, wherein the main body includes a plurality of rails, and wherein the lid is configured to be slidable along the plurality of rails such that the lid and the holding member are removable from the main body.

2. The mobile terminal of claim 1, wherein the battery storage portion is provided in a position that is closer to one side of the main body than the other side in the long-side direction, and wherein the second portion extends from an end portion of the other side of the first portion.

3. The mobile terminal of claim 2, wherein the main body has an engagement portion that is engaged with the second portion in the other side rather than the battery storage portion.

4. The mobile terminal of claim 3, wherein the lid slides to the main body in the long-side direction for movement.

5. The mobile terminal of claim 4, wherein a space into which the second portion is movable in the long-side direction is formed in the engagement portion.

6. The mobile terminal of claim 2, wherein the holding member is positioned to overlap the first portion.

7. The mobile terminal of claim 1, further comprising the main body having a recessed engagement portion that engages with the second portion of the lid.

8. The mobile terminal of claim 1, wherein the plurality of rails extend in the long-side direction of the main body.

9. The mobile terminal of claim 1, further comprising:

a target-for-fixing portion that is fixed to the holding member; and a securing device, wherein the securing device fixes the target-for-fixing portion to the second portion of the lid, and wherein the securing device does not fix the target-for-fixing portion to the holding member.

10. The mobile terminal of claim 9, wherein the securing device includes a bolt.

11. The mobile terminal of claim 1, further comprising:

a target-for-fixing portion that is fixed to the holding member, wherein the holding member includes a clip portion, wherein the holding member includes a rotation shaft and a first pair of shaft support portions, wherein the target-for-fixing portion includes a second pair of shaft support portions, wherein the rotation shaft is supported by the first pair of shaft support portions and the second pair of shaft support portions, and wherein the clip portion is configured to rotate about the rotation shaft with respect to the target-for-fixing portion.

* * * * *